US000001944H

(19) United States

(12) Statutory Invention Registration (10) Reg. No.: US H1944 H

Cheswick et al. (43) Published: Feb. 6, 2001

(54) FIREWALL SECURITY METHOD AND APPARATUS

(75) Inventors: William Roberts Cheswick, Barnardsville, NJ (US); Edward G. Whitten, Conyers, GA (US)

(73) Assignee: Lucent Technologies Inc., Murray Hill, NJ (US)

(21) Appl. No.: 09/047,207

(22) Filed: Mar. 24, 1998

(51) Int. Cl.[7] ..... G06F 12/14

(52) U.S. Cl. ..... 713/201

(58) Field of Search ..... 713/200, 201, 713/202; 380/44

(56) References Cited

U.S. PATENT DOCUMENTS

| | | | | |
|---|---|---|---|---|
| 4,609,777 | | 9/1986 | Cargile | 364/200 |
| 4,685,055 | | 8/1987 | Thomas | 364/200 |
| 4,771,462 | * | 9/1988 | Hannan et al. | 380/44 |
| 5,081,675 | | 1/1992 | Kittirutsunetorn | 380/4 |
| 5,386,369 | | 1/1995 | Christiano | 364/464.01 |
| 5,568,552 | | 10/1996 | Davis | 380/4 |
| 5,615,344 | | 3/1997 | Corder | 395/309 |
| 5,666,411 | | 9/1997 | McCarty | 380/4 |
| 5,668,419 | | 9/1997 | Oktay | 307/126 |
| 5,706,426 | | 1/1998 | Hsu | 395/186 |
| 5,987,611 | * | 11/1999 | Freund | 713/201 |

* cited by examiner

*Primary Examiner*—Daniel T. Pihulic

(74) *Attorney, Agent, or Firm*—Donald P. Dinella

(57) ABSTRACT

A technique for the delivering a client-based firewall. A firewall security device is configured for connecting to individual clients, e.g., personal computers, for providing firewall security measures directly to the client. The firewall security device is configured as a electronic dongle which is attached to an external communications port of the client, e.g., the parallel communications port. The incoming communications stream to the client from, e.g., public networks, is passed through the firewall security device. In this way, the firewall security device applies and delivers a set of standard network security measures thereby protecting the client from security breaches triggered by the communications stream received from the public network. Advantageously, the firewall is delivered directly by the client without intervention, use, or connection to a separate firewall server.

28 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIREWALL SECURITY METHOD AND APPARATUS

FIELD OF THE INVENTION

The present invention relates to network security and, more particularly, to a firewall security technique employed in computer networks.

BACKGROUND OF THE INVENTION

Advances in communications technology and the availability of powerful desktop computer hardware has increased the use of computers to access a variety of publicly available computer networks. For example, the speed of modems, which are well-known communication devices used for transforming a digital bit stream into an analog signal, has significantly increased thereby providing for the high-speed exchange of information across, e.g., the public switched telephone network (PSTN.) Today, a tremendous amount of information is exchanged between individual users located around the world via public computer networks, e.g., the Internet. One class of users includes private individuals and professional users interconnected via a private network, e.g., a corporate intranet.

The exchange of information between private and public computer networks has presented a variety of critical security issues for the protection of information on the private computer networks and the overall functionality of the private computer network itself. Numerous well publicized accounts exist of individuals known as "hackers" who have improperly breached the security of private computer networks and caused severe damage. In particular, some of the most sophisticated types of security threats are posed by programs which exploit certain vulnerabilities within network computing systems. To name a few, these program-related security threats include well-known logic bombs, trapdoors, trojan horses, viruses and worms, as described, e.g., by W. Stallings, *Network and Internetwork Security Principles and Practice*, Prentice-Hall, Inc., Englewood Cliffs, N.J., 1995. Such well-known software program threats either work independently (e.g., worms) to achieve their desired security breach, or require the invocation of a host program to be invoked to perform the desired disruptive actions (e.g., trapdoors, logic bombs, trojan horses or viruses.) Such damage has included the destruction of electronic files, alteration of databases, or the introduction of computer viruses which affect the operability of the private computer network or computer hardware connected to the private network.

Computer network security, at a minimum, is directed to ensuring the reliable operation of computing and networking resources, and protecting information within the private network from unauthorized disclosure or access. Network administrators responsible for the operation of private computer networks employ a variety of security measures to protect the network from external security breaches by unauthorized users. One well-known technique uses so-called "firewalls". This security scheme essentially places a separate computer system, i.e., the firewall, between the private network and the public network, e.g., the Internet. Commonly, these firewalls are software-based gateways that are typically installed on a separate server to protect computers on a local area network ("LAN") within a private network from attacks by outsiders, i.e., unauthorized users.

In particular, the firewall server maintains control over communications from and to the private network. Essentially, the firewall server imposes certain security measures on all users employing the private network. For example, firewalls may block access to new Internet services or sites on the well-known World Wide Web ("WWW") because the security consequences are unknown or not accounted for by the present firewall configuration. One potential installation configuration of a firewall is that WWW clients can no longer directly contact WWW servers. Typically, this proves too restrictive, and network administrators employ so-called "proxy servers". Proxy servers are designed with certain features which provide for the forwarding of requests from WWW clients through the firewall thereby providing communication flow to and from servers on the Internet.

FIG. 1 shows such a prior art network configuration 100 employing separate servers, e.g., firewall server 120 and proxy server 140, for delivering firewall security to, e.g., private network 130. As shown in FIG. 1, firewall server 120 is a separate computer system situated between public network 110 and private network 130 for delivering network security measures to the communications exchanged between the networks. As will be appreciated, the investment in delivering the server-based firewall of FIG. 1 from a hardware, facilities management and network management perspective is significant. Of course, for very large private networks the cost of installing and maintaining such a dedicated server-based firewall is justified in view of the potential damage which network security breaches can inflict inside the private network. However, for small/medium sized networks and individual computer users, the cost of a server-based firewall security configuration can be prohibitive.

A need exists therefore for a client-based firewall technique which provides for network security within e.g., a private network.

SUMMARY OF THE INVENTION

The present invention provides a technique for delivering a client-based firewall. In accordance with the invention, a firewall security device is configured for connection to individual clients, e.g., personal computers, for providing firewall security measures directly to the client. The firewall security device, in accordance with the preferred embodiment of the invention, is configured as a electronic dongle which is attached to a communications port of the client, e.g., the parallel communications port. In accordance with the invention, the incoming communications stream to the client from, e.g., public networks, is passed through the firewall security device. In this way, the firewall security device applies and delivers a set of standard security routines thereby protecting the client from security breaches triggered by the communications traffic received from the public network. Illustratively, the set of security routines define at least one security level to which all communications exchanged by the client must comply thereby insuring that the integrity of the private network in which the client is interconnected. Advantageously, in accordance with the invention, the firewall is delivered directly by the client without intervention, use, or connection to a separate firewall server.

Electronic dongle devices are not new. Dongles have been used previously for the protection and control of individual software programs. Such dongles are described in, for example, U.S. Pat. No. 5,668,419, issued to O. Oktay, entitled "Reconfigurable Connector" which describes a reconfigurable connector for a peripheral device, and U.S. Pat. No. 5,568,552, issued to D. L. Davis, entitled "Method For Providing A Roving Software License From One Node To Another Node" which describes a device for enforcing certain software licensing restrictions. One conventional use of dongles was the packing of such devices along with a particular software package purchased or licensed by an individual user. Typically, the dongle was coupled to the parallel port of the user's personal computer. Thereafter, at various times during the execution of the software by the user, the software program transmits an authorization message to the computer's external communications port. Upon receipt of such a message, the dongle (if present) generates a unique identifier, e.g., a token, for transmission back to the executing software program. If the dongle is not present, the software program terminates. Otherwise, the software program compares the token to an internally stored identifier and permits further execution only if the responses match.

Thus, dongles are well-known devices for controlling access to and execution of individual programs by authorized users. It has, however, remained for the inventors herein to recognize that such devices provide an elegant tool by which a client-based firewall can be delivered to the reduce the risk of computer network security breaches in today's complex computer network arrangements resulting from the widespread exchange of communications between a variety of disparate networks.

DETAILED DESCRIPTION

The present invention provides a technique for delivering a client-based firewall. In accordance with the invention, a firewall security device is configured for connection to individual clients, e.g., personal computers, for providing firewall security measures directly to the client. The firewall security device, in accordance with the preferred embodiment of the invention, is configured as a electronic dongle which is attached to a communications port of the client, e.g., the parallel communications port. In accordance with the invention, the incoming communications stream to the client from, e.g., public networks, is passed through the firewall security device. In this way, the firewall security device applies and delivers a set of standard security routines thereby protecting the client from security breaches triggered by the communications traffic received from the public network. Illustratively, the set of security routines define at least one security level to which all communications exchanged by the client must comply thereby insuring the integrity of the private network in which the client is interconnected. Advantageously, in accordance with the invention, the firewall is delivered directly by the client without intervention, use, or connection to a separate firewall server.

Figure 1:
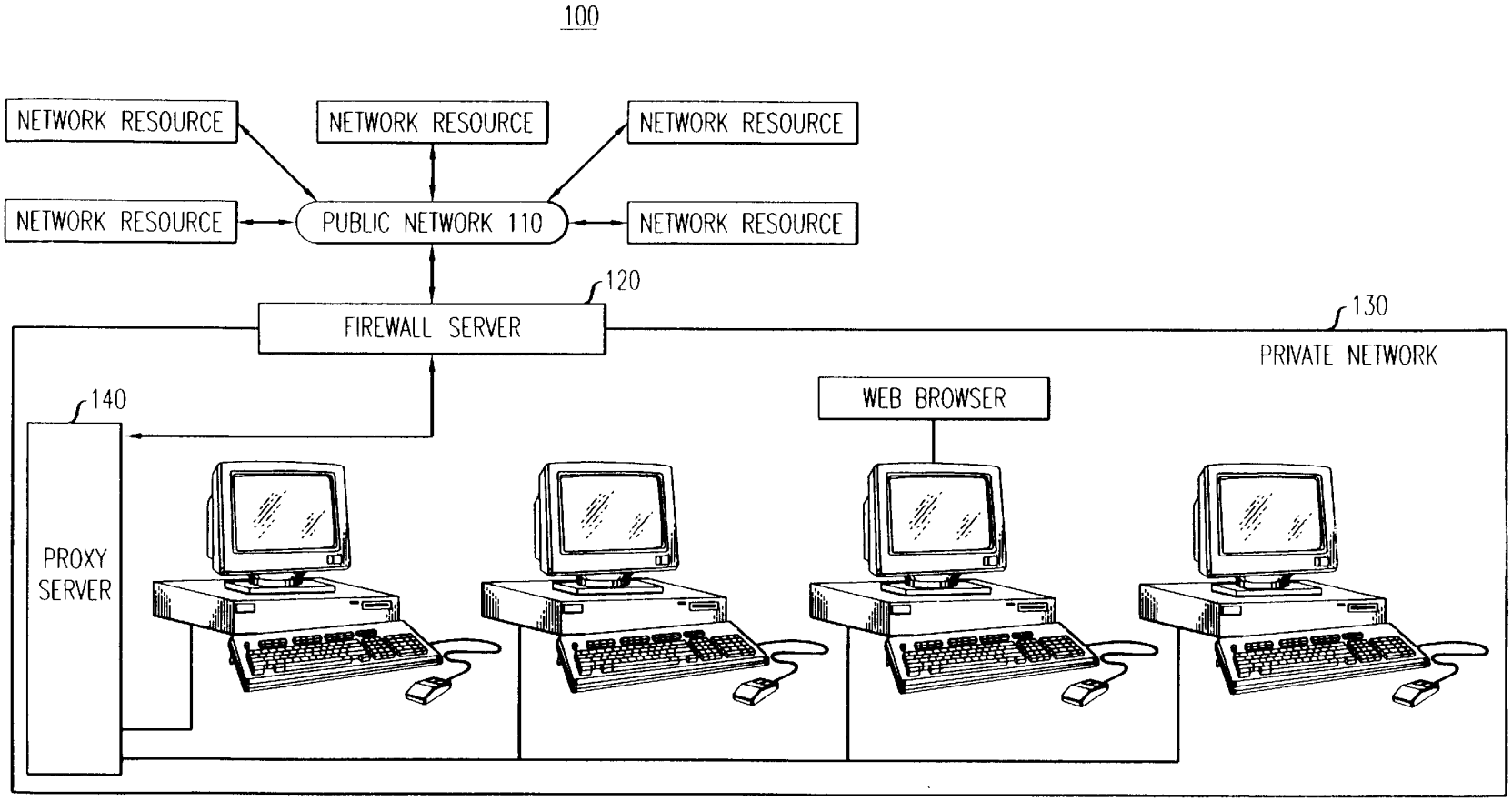
FIG. 1 (PRIOR ART)
FIG. 1 shows a network configuration having a prior art server-based firewall.
Figure 2:
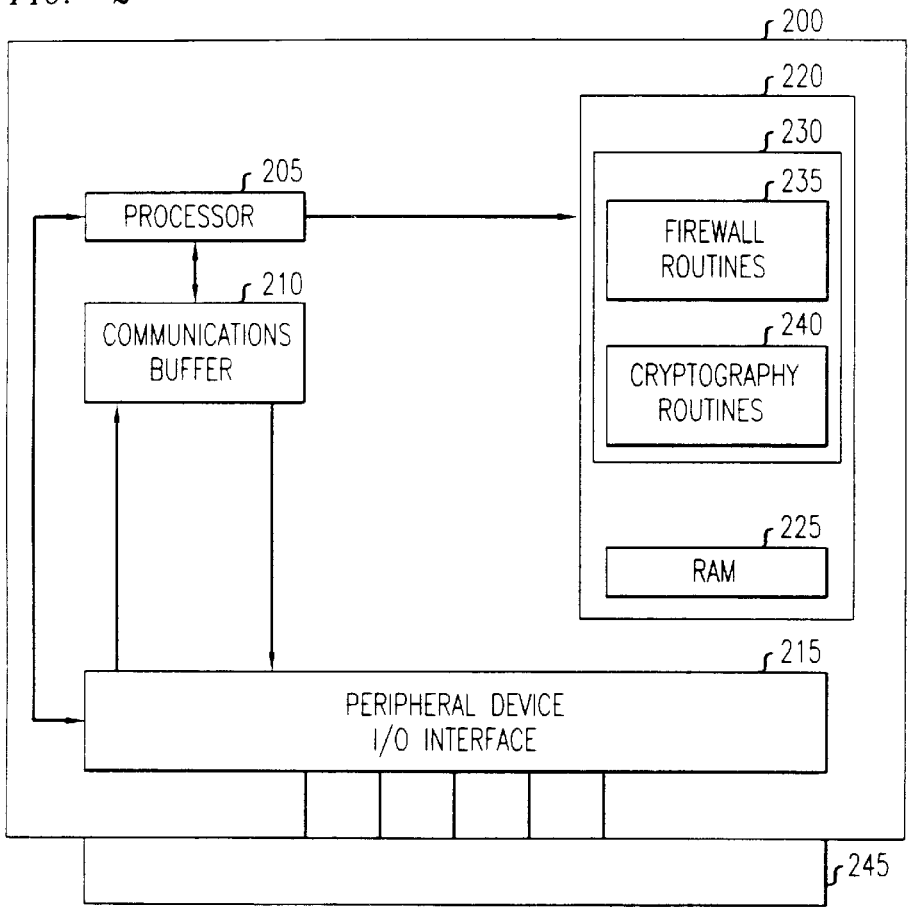
FIG. 2 shows an illustrative firewall security device configured in accordance with the principles of the invention.

FIG. 2 shows an illustrative firewall security device 200 configured in accordance with the principles of the invention. More particularly, firewall security device 200 includes processor 205, communications buffer 210, peripheral device I/O interface 215, memory element 220 (comprising random access memory ("RAM") 225 and non-volatile memory 230), firewall routines 235, cryptography routines 240 and connector 245. Connector 245 is, illustratively, a conventional parallel-type connector (e.g., a DB-25 connector) for coupling to, illustratively, a standard parallel communications port of a personal computer. In accordance with preferred embodiments of the invention, firewall security device 200 is powered in a conventional manner as supplied from, e.g., the parallel communications port into which firewall security device 200 is connected. In accordance with further embodiments of the invention, power is supplied to firewall security device 200 from a conventional battery source incorporated within the device itself. As will be appreciated, memory element 220 further includes RAM 225 in order to store data, e.g., certain computational results, generated in a conventional manner from processor 205.

Figure 3:
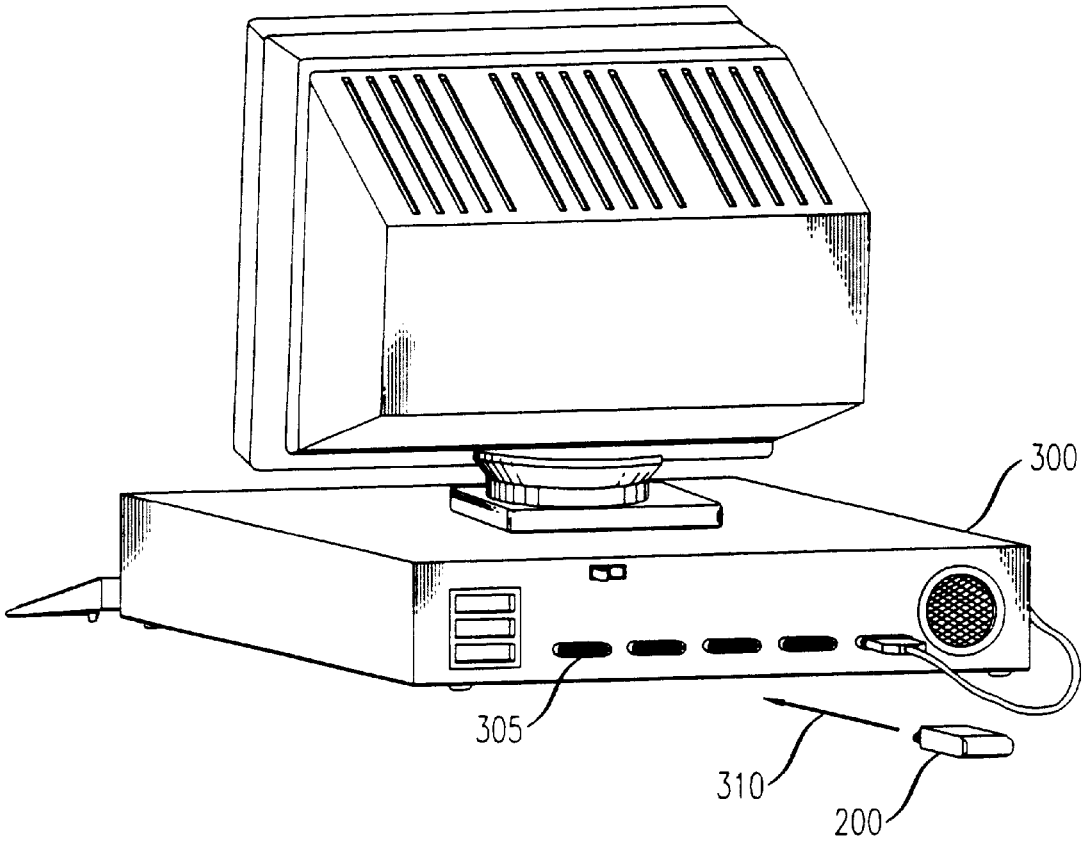
FIG. 3 shows an illustrative client configured with the firewall security device of FIG. 2 for delivering a client-based firewall in accordance with the invention.

Turning our attention briefly to FIG. 3, an illustrative embodiment of the invention is shown for configuring a user terminal, e.g., personal computer 300, with firewall security device 200 by connecting (see, directional arrow 310) firewall security device 200 to parallel communications port 305. Thus configured, firewall security device 200, in accordance with the invention, provides personal computer 300 with a complete client-based firewall security arrangement as further described below. As will be appreciated, the user terminal can by any hardware apparatus (e.g., stand-alone personal computer, networked personal computer, network terminal, etc.) which requires some level of security protection from unauthorized access to the apparatus itself or the network in which the apparatus is interconnected. Advantageously, in accordance with the invention, a client-based firewall is delivered without the need for the user terminal, e.g., personal computer 300, to have a connection with a separate server in a private network for the delivery of firewall security measures.

Turning our attention back to FIG. 2, peripheral device I/O interface 215 facilitates the transfer of a communications stream through firewall security device 200 in accordance with the invention. As will be appreciated the communications stream represents any conventional exchange of information by, e.g., a personal computer. For example, the communications stream can be a series of data bits as exchanged via conventional modem devices or a plurality of Transfer Control Protocol/Internet Protocol ("TCP/IP") packets. Thus, the principles of the invention apply to a variety of communications streams for delivering the various security aspects of the invention. As will be readily understood, the communications stream is, in accordance with various embodiments of the invention, data which is exchanged via a conventional TCP/IP connection between a user terminal and network resource. As is well-known, TCP/IP is the protocol which is used in describing the way in which information is transferred across the Internet. Essentially, TCP/IP separates information into individual packets and routes these packets between the sending computer, e.g., server, and the receiving computer, e.g., client. TCP/IP and Internet communications are discussed in more detail, e.g., by D. Comer., *Internetworking with TCP/IP*, Third edition, Prentice-Hall, Englewood Cliffs, N.J., 1995.

That is, when firewall security device 200 is connected to a user terminal, e.g., as shown in FIG. 3, all communications traffic to and from the user terminal is passed through firewall security device 200. Thus, peripheral device I/O interface 215 facilitates the exchange of data communications between the firewall security device 200, the user terminal to which firewall security device 200 is connected, and some external network, e.g., the Internet. The data communications exchange itself occurs in a conventional manner, e.g., in accordance with well-known parallel data communications transfers between computer hardware devices. In accordance with the preferred embodiment of the invention, the user terminal to which firewall security device 200 is connected has certain conventional software drivers to facilitate the direction of all communications traffic exchanged by the user terminal through firewall security device 200. In accordance with preferred embodiments of the invention, such software drivers are in the form of well-known dynamic link library ("DLL") drivers. DLL's are well-known libraries of functions that applications link to at execution time as opposed to compile time and are described in more detail, e.g., by A. King, *Inside Windows*™95, Microsoft Press, Redmond, Wash., 1994. Thus, in accordance with the preferred embodiments of the invention, DLL's provide the facilities for the direction of all communications traffic exchanged by the user terminal through firewall security device 200.

For example, the DLL can provide an additional layer in a conventional TCP/IP stack, between either the user terminal and IP layers, or between IP layers and well-known TCP/UDP layers, to intercept, divert, and/or block packets in accordance with invention. More particularly, turning our attention briefly to FIG. 6, an illustrative TCP/IP stack 600 arrangement is shown for a client configured with firewall security device 200 (see, e.g., the client configuration shown in FIG. 3.) TCP/IP stack 600 residing on the client, e.g., personal computer 300, has various conventional layers such as ethernet layer 630, IP layer 650, TCP layer 660, and application layer 670. As will be understood, such layers correspond to the well-known network interface layer, network (Internet) layer, transport layer, and application layer, respectively, of the standard TCP/IP stack. In accordance with this embodiment of the invention, TCP/IP stack 600 further includes firewall security layer 640 implemented through a DLL, as described above, which facilitates the direction of all communications traffic exchanged by the client through firewall security device 200 for delivering the various security aspects of the invention.

Figure 6:
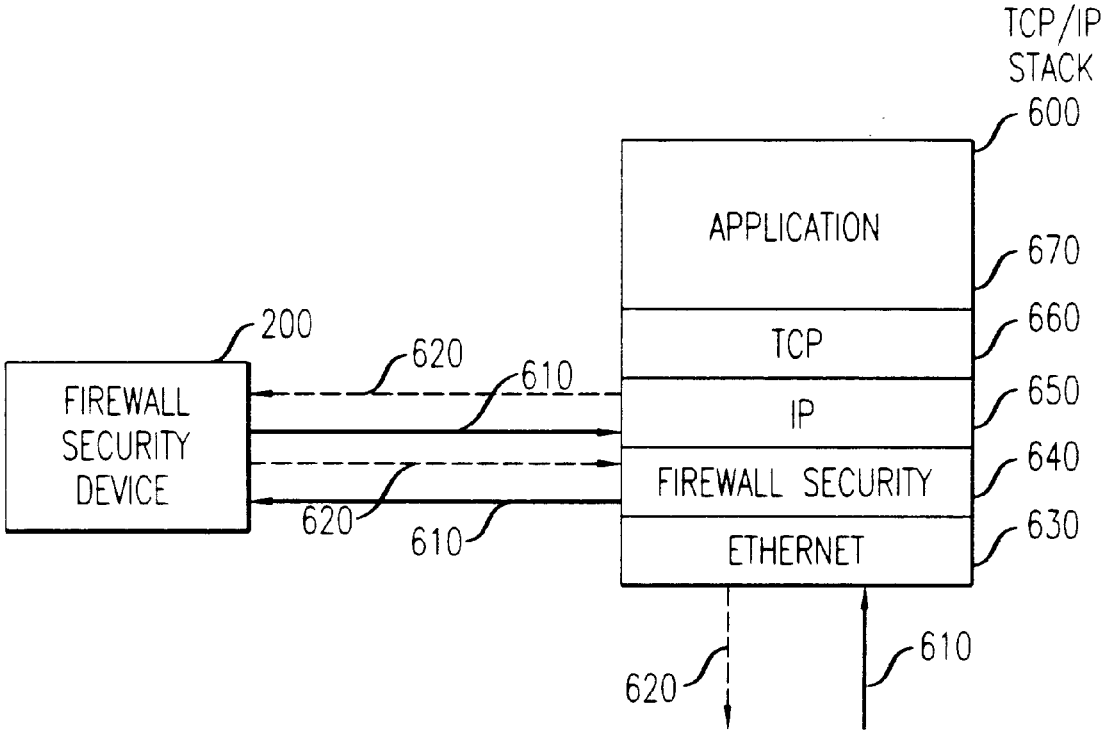
FIG. 6 shows an illustrative TCP/IP stack arrangement of the client configured with the firewall security device as shown in FIG. 3.

For example, as shown in FIG. 6, incoming communications stream 610 (e.g., as received by personal computer 300) is received and processed through ethernet layer 630 and immediately directed through firewall security device 200 for delivery of the client-base firewall in accordance with the invention. The direction of incoming communications stream 610 is facilitated by firewall security layer 640 as well as the continuing transmission and processing of incoming communications stream 610 up through TCP/IP stack 600. Further, outgoing communications stream 620 from the client, e.g., personal computer 300, is also transmitted down through TCP/IP 600 stack to firewall security device 200 to ensure the security of the outgoing transmission, in accordance with the client-based firewall of the invention. As described above, in accordance with preferred embodiments of the invention, the exchange of communications between the client and firewall security device 200 is enable through the direct coupling of the security device to the parallel communications port of the client.

In various embodiments of the invention, communications buffer 210, e.g., a first-in-first-out ("FIFO") buffer, is used for queuing, in a conventional manner, the incoming communications stream to firewall security device 200. As will be appreciated, in further embodiments of the invention, the need for communications buffer 210 can be eliminated when, e.g., the speed or configuration of processor 205 eliminates the need for any such data buffering. Processor 205 in conjunction with firewall routines 235 and cryptography routines 240 facilitate the delivery of the client-based firewall in accordance with the principles of the invention.

That is, in accordance with the preferred embodiment of the invention, firewall routines 235 and cryptography routines 240 govern the specific firewall security measures which will be applied to any communications stream being transmitted through the particular user terminal, e.g., personal computer 300, to which firewall security device 200 is connected. As described previously, firewall routines 235 and/or cryptography routines 240 define at least one security level to which the communications stream of the user terminal must comply. Illustratively, firewall routines 235 are delivered by commercially available firewall application software, e.g., the Lucent Managed Firewall available from Lucent Technologies Inc., which provide for conventional firewall functions such as the filtering and auditing of a communications stream at the packet, circuit, and/or application levels. Further, cryptography routines 240 include, e.g., symmetric cryptography routines such as well-known Data Encryption Standard ("DES") routines, or asymmetric cryptography routines such as well-known Rivest-Shamir-Adleman ("RSA") routines. As will be appreciated, firewall routines 235 and cryptography routines 240 can be periodically updated directly by the user of firewall security device 200 or by downloading certain updated routines from a central source, e.g., a server on the Internet.

In accordance with the invention, firewall routines 235 facilitate the delivery of firewall security measures by firewall security device 200 to, e.g., the user terminal to which it is connected. For example, firewall security device 200 may deliver a packet or circuit filter which permits all outgoing TCP connections but blocks all incoming TCP connections (except electronic mail) and also blocks all conventional User Datagram Protocol C"UDP") packets except for well-known Domain Name Service ("DNS") packets. Further, illustratively, firewall security device 200 can deliver an application-level filter for checking the addressing and content of electronic mail transmitted to/from, e.g. personal computer 300, for appropriate addressing schemes, file size, and/or the presence of computer viruses. As will be appreciated, in accordance with the invention, firewall security device 200 can be configured to deliver a wide variety of firewall filtering arrangements useful in detecting and averting network security breaches.

Figure 4:
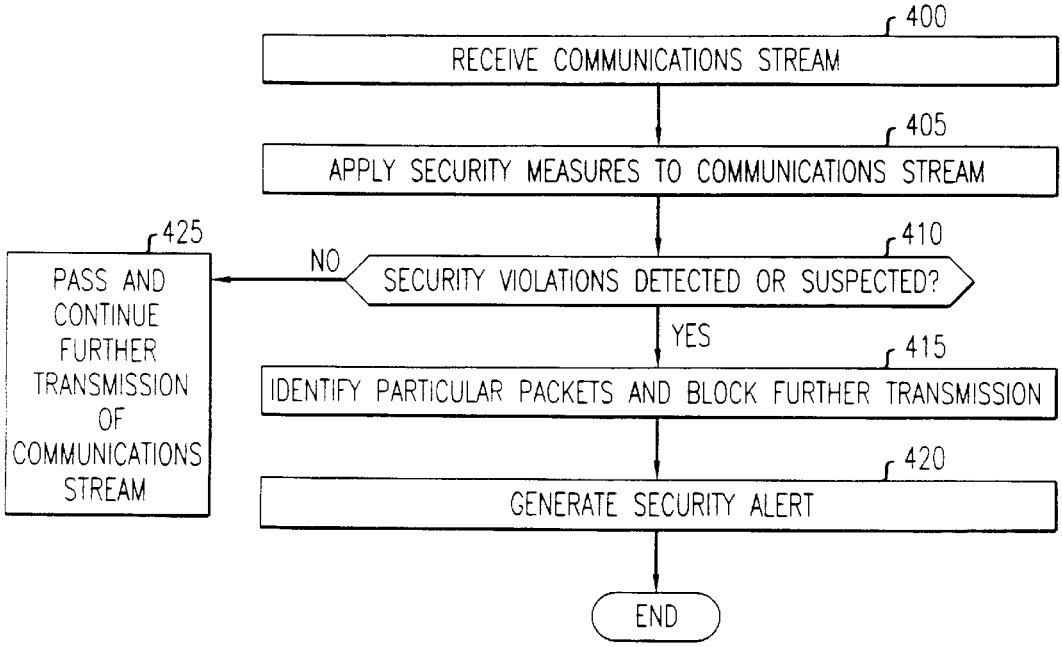
FIG. 4 is a flowchart of illustrative operations performed, in accordance with the invention, by the firewall security device of FIG. 2.

FIG. 4 is a flowchart of illustrative operations performed by firewall security device 200 (see, FIG. 2) in accordance with the principles of the invention. In particular, the communications stream exchanged by the user terminal to which firewall security device 200 is connected is received (see, block 400) by firewall security device 200. As described above, in accordance various embodiments of the invention, the communications stream is a plurality of TCP/IP packets being routed from a source machine to a destination machine. Thus, firewall security device 200 applies the particular security measures defined by firewall routines 235 to the communications stream (see, block 405). Therefore, through the application of firewall routines 235 and/or cryptography routines 240, firewall security device 200 is enabled for determining whether the communications stream complies with the desired security level for the client to which firewall security device 235 is connected. Moreover, in accordance with the invention, firewall security device 200 provides for the detection of specific security violations contained within the communications stream and/or suspect communications (see, block 410) which may lead to a security breach. If no such security violations are detected, the communications traffic is passed and continued for further transmission to the user terminal (see, block 425.) Otherwise, if a security violation is detected, the individual non-complying packets are identified and blocked from further transmission (see, block 415) within the user terminal thereby protecting the user terminal from any potential security breach. In further embodiments of the invention, it may also be desirable to generate a security alert (see, block 420) to, e.g., a network security administrator, for further remedial action in addressing the security breach.

Figure 5:
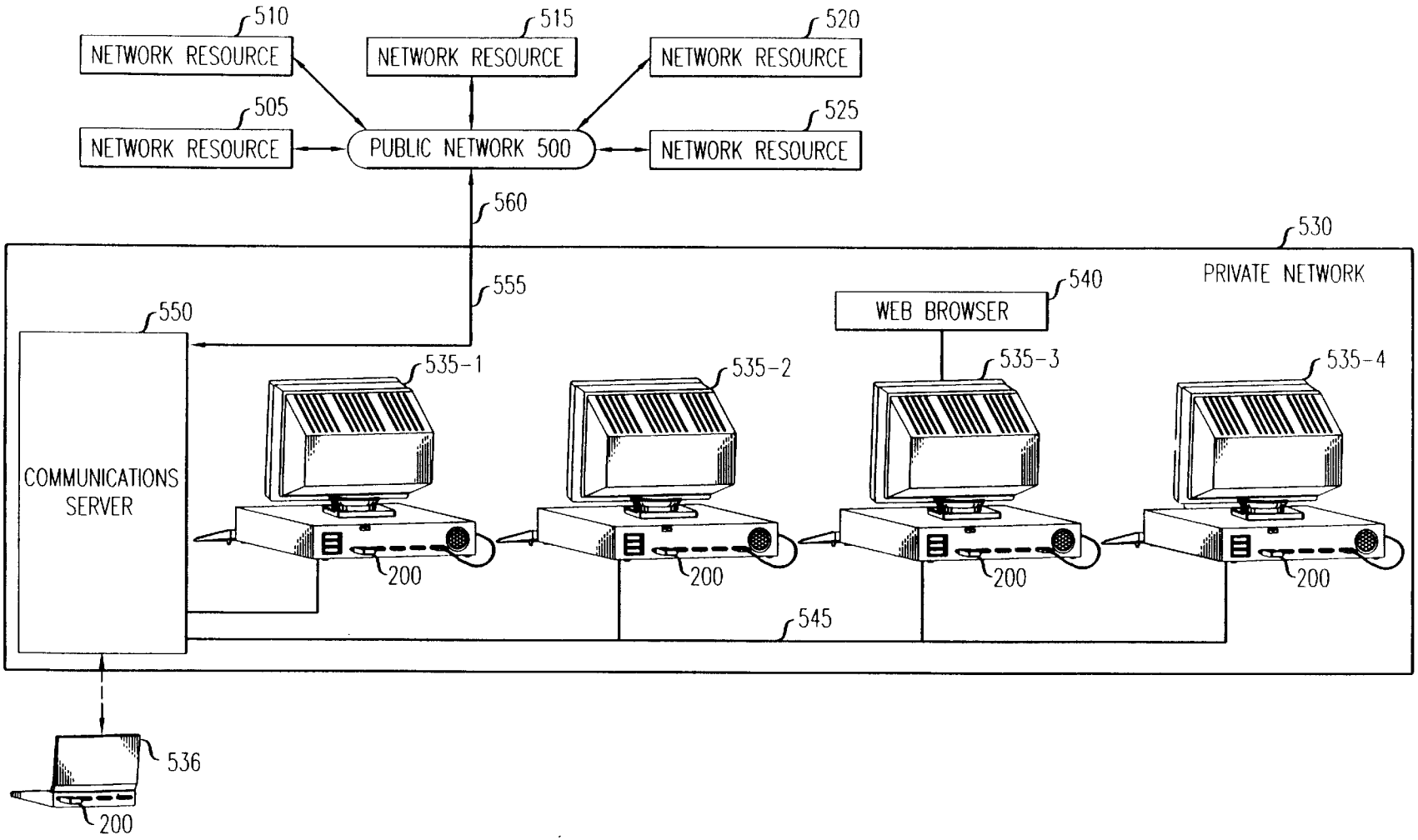
FIG. 5 shows an illustrative system incorporating the client-based firewall of the invention and as depicted, illustratively, in FIG. 2 and FIG. 3.

To further facilitate an understanding of the invention and further to the description of the invention above, FIG. 5 shows an illustrative system incorporating the client-based firewall of the invention. As shown in FIG. 5, the system includes public network 500, e.g., the Internet, and network resources 505, 510, 515, 520, and 525. Illustratively, network resources 505 through 525 can be linked together using files written in the well-known Hypertext Mark-up Language ("HTML") thereby representing the well-known WWW. The WWW and HTML are described in more detail, e.g., by B. White, *HTML and the Art of Authoring for the World Wide Web*, Kluwer Academic Publishers, Norwell, Mass., 1996. Illustratively, private network 530 is a network located within a particular user site, e.g., a corporation's headquarters building, having user terminals 535-1, 535-2, 535-3, and 535-4, each configured, in accordance with the invention, with firewall security device 200 and linked together via LAN 545. As will be appreciated, user terminals 535-1 through 5354 can be, e.g., stand-alone personal computers or network terminals. For simplicity of explanation herein, only one such LAN configuration is shown in FIG. 5, however, as will be appreciated private network 530 may include several such LAN configurations similar in nature to LAN 545.

A particular user of any one of user terminals 535-1 through 535-4 may cause a client program executing on, e.g., user terminal 535-3, to request certain resources which are available on the WWW, e.g., network resources 505-525. As mentioned previously, such requests to the WWW via the Internet from private network 530 pose certain security risks to both private network 530 and user terminals 535-1 through 535-4. Thus, as shown in FIG. 5, user terminals 535-1, 535-2, 535-3 and 535-4, are each configured with firewall security device 200 (see, also FIG. 3) for the delivery of certain security features, in accordance with the invention, to protect private network 530 and its various computing resources. Illustratively, firewall security device 200 is configured either locally, e.g., directly by user terminal 535-1, or from central source, e.g., a communications server 550. Advantageously, in accordance with the invention, the need for a separate firewall computer system, i.e., a firewall server, between private network 530 and public network 560, e.g., the Internet, is completely eliminated.

That is, the firewall security device 200 attached to each of user terminals 535-1 through 535-4 monitors and maintains control over communications from and to the terminals. More particularly, the client-based firewall of the invention first determines if the requested connection between a user terminal in the private network and the public network is authorized. The client-based firewall serves as an intermediary between the user terminal in the private network and the public network and, if the connection is authorized, facilitates the requisite connection between the two networks. Alternatively, if the connection is unauthorized, the client-based firewall blocks the transmission and prevents any connection between the networks from occurring as described previously.

Illustratively, a user employing user terminal 535-3 may access certain web pages on the WWW using web browser 540. Web browsers are well-known software application programs (e.g., Netscape® v. 5.0, available from Netscape Communications) which enable a user to traverse the WWW and access the vast amount of information available throughout the WWW. Thus, web browser 540 receives an input request from the user of user terminal 535-3 and attempts to locate the information on the WWW by establishing a connection with the appropriate resource, e.g., network resource 505, on the WWW through public network 500. An authorized communication between user terminal 535-3 and network resource 505 is established through firewall security device 200 as connected to user terminal 535-3. More particularly, firewall security device 200, acting in conjunction with and on behalf of web browser 540, will control the establishment of a conventional TCP/IP connection between user terminal 535-3 and network resource 505. In accordance with the present embodiment, the TCP/IP connection between user terminal 535-3 and network resource 505 is made using communications server 550 and across communication channels 555 and 560, respectively.

As seen from FIG. 5, all communications traffic between public network 500 and user terminals 535-1 through 525-4 of private network 530 necessarily passes through the particular firewall security device 200 connected to the user terminals. In recognition of this communications traffic attribute, we have realized that firewall security device 200, in electronic dongle device form, provides a preferred configuration for implementing the security advantages of our invention. However, as will be appreciated, the principles of the invention are also realized in other network environments and configurations.

For example, in accordance with a further embodiment of the invention, portable personal computer 536 includes firewall security device 200 connected thereto. Illustratively, a remote user, e.g., a traveling business executive, requiring access to private network 530 can gain access to communications server 550 from a public network, e.g., the Internet, in a conventional manner. Upon establishing the connection with communications server 550, the user of portable personal computer 536 can, as described above, access public network 500 for the downloading of information from, e.g., the Internet. As will be apparent, such remote connection poses similar network security issues as raised by the network resource requests originating from any of the user terminals 535-1 through 535-4 located within the physical configuration of private network 530. Advantageously, in accordance with the invention, the client-based firewall facilitated by the coupling of firewall security device 200 to portable personal computer 536 mitigates such network security concerns.

Our invention allows for the delivery of firewall security measures to any authorized client either inside or outside of the private network without having to be connected to a dedicated network firewall server. Therefore, the security features delivered by the present invention are realized in a variety of network, hardware, and software configurations including, but not limited to, the system configuration of FIG. 5. For example, the firewall security device configured in accordance with invention can be used to provide firewall capabilities to routers which are well-known apparatus used for the exchange of messages between local area networks and a backbone, e.g. a wide area network.

The foregoing merely illustrates the principles of the present invention. Therefore, the invention in its broader aspects is not limited to the specific details shown and described herein. Those skilled in the art will be able to devise numerous arrangements which, although not explicitly shown or described herein, embody those principles and are within their spirit and scope.

We claim:

1. A computer security apparatus comprising:

a memory for storing a plurality of security routines, the plurality of security routines defining at least one security requirement;

a connector for connecting the computer security apparatus to a user terminal; and a processor for applying at least one security routine to a communications stream of the user terminal, at least a portion of the communications stream being transmitted through the computer security apparatus.

2. The computer security apparatus of claim 1 wherein the communications stream is received by the user terminal from a public network.

3. The computer security apparatus of claim 2 wherein the connector is connected to a communications port of the user terminal.

4. The computer security apparatus of claim 2 further comprising:

a buffer for storing the communications stream received from the public network.

5. A firewall security device comprising:

a memory for storing a plurality of firewall security routines, the plurality of firewall security routines defining at least one security requirement;

a connector for connecting the firewall security device to a user terminal; and a processor for applying at least one firewall security routine to a plurality of packets transmitted through the firewall security device and determining whether particular ones of the plurality of packets are in compliance with the at least one security requirement.

6. The firewall security device of claim 5 wherein the connecting the firewall security device to the user terminal is made through a parallel communications port of the user terminal.

7. The firewall security device of claim 6 wherein the memory further comprises a plurality of cryptography routines for use in the determining whether the particular ones of the plurality of packets are in compliance with the at least one security requirement.

8. A firewall security device for use with a computer having a communications port, the firewall security device comprising:

a memory for storing a firewall security application program, the firewall security application program containing a plurality of firewall security routines which define at least one level of security;

a connector for connecting the firewall security device to the communications port of the computer; and a processor for executing the firewall security application program and determining whether a plurality of packets transmitted to the computer from a public network are in compliance with the level of security, the plurality of packets being transmitted through the firewall security device prior to any further processing by the computer.

9. The firewall security device of claim 8 further comprising a communications buffer for storing the plurality of packets and blocking particular ones of the plurality of packets, determined by the processor to be not in compliance with the level of security, from further processing by the computer.

10. The firewall security device of claim 8 wherein the communications port is a parallel communications port.

11. The firewall security device of claim 9 wherein the level of security is determined as a function of a private network configuration in which the computer is connected.

12. A dongle for providing a client-based firewall, the dongle comprising:

a memory for storing a plurality of firewall security routines, the plurality of firewall security routines defining at least one security level;

a connector for connecting the dongle to a client computer; and a processor for applying at least one firewall security routine to a plurality of packets transmitted through the dongle and determining whether particular ones of the plurality of packets are in compliance with the at least one security level.

13. The dongle of claim 12 wherein the particular ones of the plurality of packets determined to be in compliance with the at least one security level are transmitted to the client computer for further processing.

14. The dongle of claim 13 wherein the plurality of packets are transmitted to the dongle upon receipt by the client computer.

15. A client-based firewall system comprising:

a computer having at least one communications port;

a firewall security dongle connected to the at least one communications port, the firewall security dongle including:

a memory for storing a plurality of firewall security routines, the plurality of firewall security routines defining at least one security level;

a processor for applying at least one firewall security routine to a data communications stream transmitted through the firewall security dongle and determining whether the data communications stream complies with the security level.

16. The client-based firewall system of claim 15 wherein the data communications stream includes a plurality of TCP/IP packets.

17. The client-based firewall system of claim 15 wherein the firewall security dongle blocks particular ones of the packets not complying with the security level.

18. The client-based firewall system of claim 16 wherein the level of security is determined as a function of a private network configuration in which the computer is connected.

19. A method for providing a client-based firewall, the method comprising:

receiving, in a firewall security dongle, a transmission of a communications stream, the firewall security dongle including a plurality of network security routines and being connected to a communications port of a particular client computer of a plurality of client computers in a private network;

applying at least one network security routine to the communications stream; and determining whether the communications stream complies with a level of security defined by the at least one network security routine.

20. The method of claim 19 further comprising the steps of:

continuing the transmission of the communications stream from the firewall security dongle to the client computer if the communications stream complies with the level of security, otherwise, blocking the transmission of the communications stream from further processing by the client computer.

21. The method of claim 20 wherein the blocking the transmission of the communications stream further includes the step of generating a security alert.

22. The method of claim 20 wherein the transmission of the communications stream includes a plurality of packets transmitted from a public network to the private network.

23. The method of claim 22 wherein the level of security is determined as a function of a configuration of the private network.

24. A computer network security method, the method comprising the steps of:

connecting a security device to at least one computer of a plurality of computers being interconnected within a private network, the security device including at least one set of security routines which define at least one network security level;

transmitting a plurality of packets received by the at least one computer through the security device connected thereto; and determining if the plurality of packets transmitted through the security device comply with the network security level.

25. The method of claim 24 further comprising the step of:

blocking a further transmission of the plurality packets by the computer if the determining step found that any packet of the plurality of packets did not comply with the network security level.

26. The method of claim 25 wherein the plurality of packets received by the computer are from a public network.

27. The method of claim 26 wherein the plurality of packets from the public network were transmitted as a function of a request from the private network for accessing a particular resource within the public network.

28. The method of claim 26 including the further step of:

updating the set of security routines from a central source.

* * * * *